United States Patent
Shi et al.

(10) Patent No.: US 7,452,189 B2
(45) Date of Patent: Nov. 18, 2008

(54) CERAMIC MATRIX COMPOSITE TURBINE ENGINE VANE

(75) Inventors: Jun Shi, Glastonbury, CT (US); Stuart S. Ochs, Manchester, CT (US); Kevin E. Green, Broad Brook, CT (US); David C. Jarmon, Kensington, CT (US); Michael K. Sahm, Avon, CT (US); Lisa A. Prill, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 344 days.

(21) Appl. No.: 11/417,972

(22) Filed: May 3, 2006

(65) Prior Publication Data
US 2007/0258811 A1 Nov. 8, 2007

(51) Int. Cl.
*F04D 29/54* (2006.01)
(52) U.S. Cl. .............. 416/226; 416/229 R; 416/241 B; 415/200
(58) Field of Classification Search ............ 415/115, 415/200, 209.4; 416/1, 97 R, 96 R, 226, 416/229 A, 229 R, 224, 241 B; 29/889.2, 29/889.21, 889.22
See application file for complete search history.

(56) References Cited

U.S. PATENT DOCUMENTS

| | | | | |
|---|---|---|---|---|
| 2,497,041 | A * | 2/1950 | Bodger | 415/209.4 |
| 3,963,368 | A * | 6/1976 | Emmerson | 415/115 |
| 4,252,501 | A * | 2/1981 | Peill | 415/115 |
| 4,396,349 | A * | 8/1983 | Hueber | 415/115 |
| 5,356,265 | A | 10/1994 | Kercher | |
| 5,577,884 | A * | 11/1996 | Mari | 415/115 |
| 5,630,700 | A | 5/1997 | Olsen et al. | |
| 6,283,708 | B1 | 9/2001 | Zelesky | |
| 6,428,273 | B1 * | 8/2002 | Keith et al. | 416/97 R |
| 6,464,456 | B2 | 10/2002 | Darolia et al. | |
| 6,514,046 | B1 | 2/2003 | Morrison et al. | |
| 6,648,597 | B1 | 11/2003 | Widrig et al. | |
| 6,709,230 | B2 | 3/2004 | Morrison et al. | |
| 2004/0253096 | A1 | 12/2004 | Legg | |
| 2005/0076504 | A1 | 4/2005 | Morrison et al. | |
| 2005/0158171 | A1 | 7/2005 | Carper et al. | |

* cited by examiner

*Primary Examiner*—Igor Kershteyn
(74) *Attorney, Agent, or Firm*—Bachman & LaPointe, P.C.

(57) ABSTRACT

A vane has an airfoil shell and a spar within the shell. The vane has an outboard shroud at an outboard end of the shell and an inboard platform at an inboard end of the shell. The spar has a first chamber essentially along the suction side and a second chamber along the pressure side opposite the first chamber.

20 Claims, 12 Drawing Sheets

INTER-LAMINAR
TENSILE STRESS
psi

-282.3
853.2

US 7,452,189 B2

CERAMIC MATRIX COMPOSITE TURBINE ENGINE VANE

U.S. GOVERNMENT RIGHTS

The invention was made with U.S. Government support under contract NAS3-01138 awarded by NASA. The U.S. Government has certain rights in the invention.

BACKGROUND OF THE INVENTION

The invention relates to turbine engines. More particularly, the invention relates to ceramic matrix composite(CMC) turbine engine vanes.

Ceramic matrix composites have been proposed for the cooled stationary vanes of gas turbine engines. One example is found in U.S. Pat. No. 6,514,046 of Morrision et al.

The high thermal loading on the vanes results in configurations with thin shells to minimize thermal stress, in particular, inter-laminar tensile stress. The thin shell works well to control the thermal stress, but it also leads to high mechanical stress resulting from the pressure differential between the shell interior and the external gas flow.

Whereas the external hot gas pressure drops sharply from the leading edge to the trailing edge, the internal cooling air pressures stay nearly constant. This creates a large pressure difference through the shell. The pressure difference causes the shell to bulge, especially on the suction side. The pressure difference causes both inter-laminar tensile stress and axial stress. These stresses may exceed design maxima, particularly, at the leading edge.

One mechanism for strengthening the shell involves spanwise tensile ribs or webs that connect the pressure side and suction side of the shell. These ribs help to carry part of the pressure loading and prevent the vane from bulging. Although they can be easily provided in all-metal vanes, manufacturing CMC ribs as integral parts of the shell is difficult. Furthermore, high tensile stress is likely to develop between the relatively cold ribs and hot shells, making such a construction less feasible.

To improve the resistance to mechanical loading, the shell thickness can be increased. This, unfortunately, drives up the thermal stress. Therefore there is an optimal wall thickness that gives the lowest combined stress. For highly loaded vanes, the stress could still be above design limits and other means to control the stress is necessary.

Yet another way to lower the stress is by increasing the smallest bend radius at the leading edge. A larger bend radius would reduce stress concentration factor and thus lower the stress. However, the external airfoil profile is optimized for best aerodynamic performance and could be highly sensitive to any changes. As a result, only the internal radius can be increased and the available amount of stress reduction is limited.

SUMMARY OF THE INVENTION

One aspect of the invention involves a vane having an airfoil shell and a spar within the shell. The vane has an outboard shroud at an outboard end of the shell and an inboard platform at an inboard end of the shell. The spar has a first chamber essentially along the suction side and a second chamber along the pressure side opposite the first chamber.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
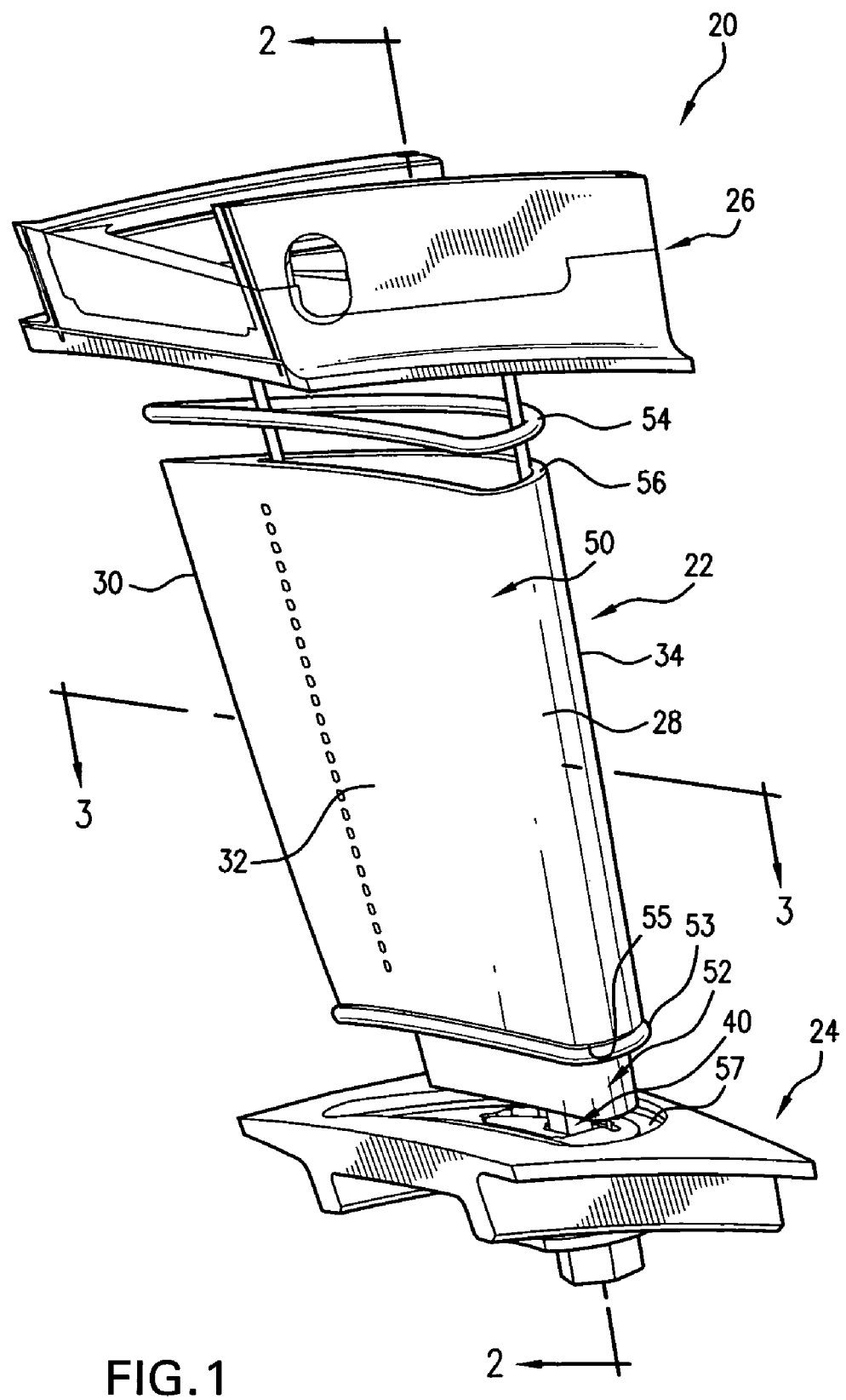
FIG. 1 is a view of a turbine vane.

FIG. 1 shows a vane 20 having an airfoil 22 extending from an inboard end at an inboard platform 24 to an outboard end at an outboard shroud 26. The airfoil 22 has a leading edge 28, a trailing edge 30, and pressure and suction side surfaces 32 and 34 extending between the leading and trailing edges. The exemplary platform and shroud form segments of an annulus so that a circumferential array of such vanes may be assembled with shrouds and platforms sealed/mated edge-to-edge.

Figure 2:
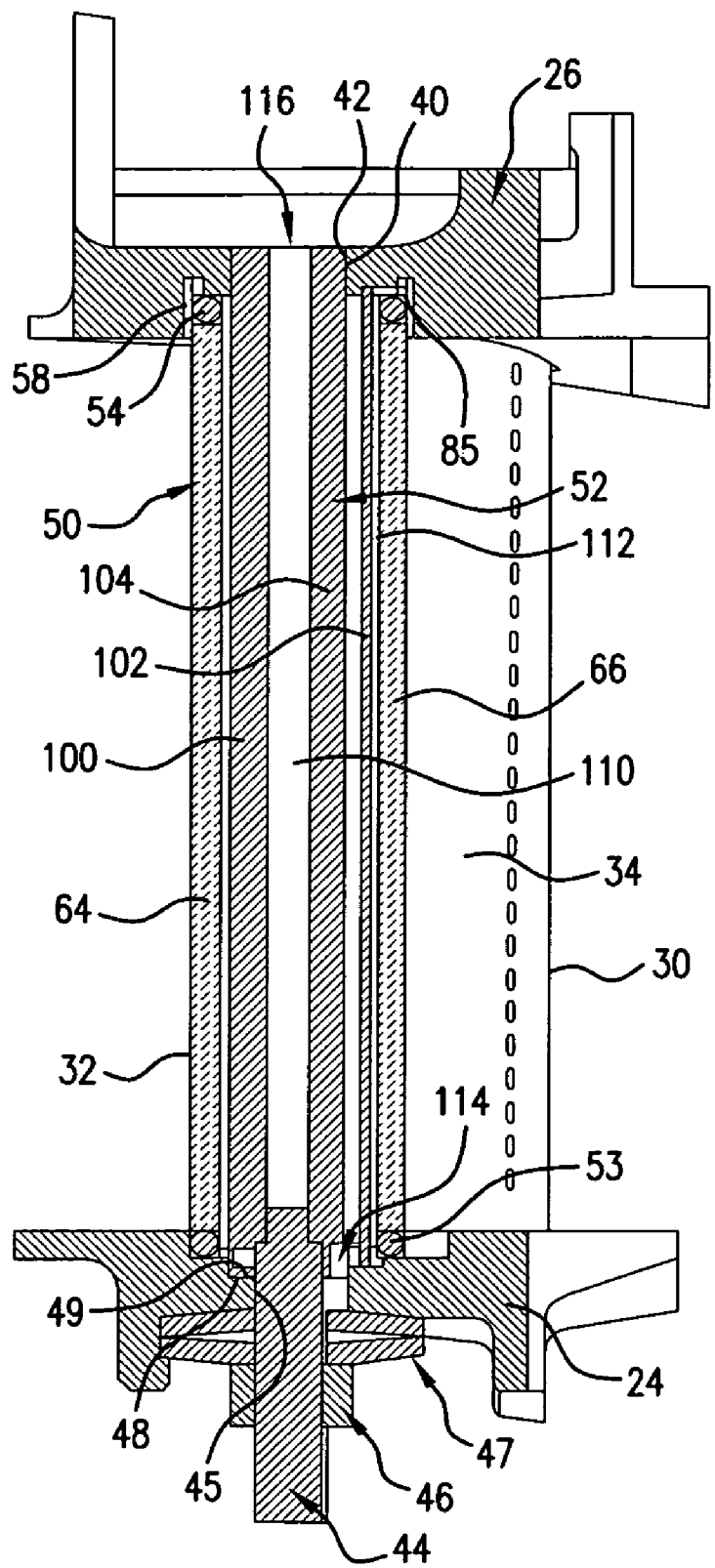
FIG. 2 is a spanwise sectional view of the vane of FIG. 1.
Figure 3:
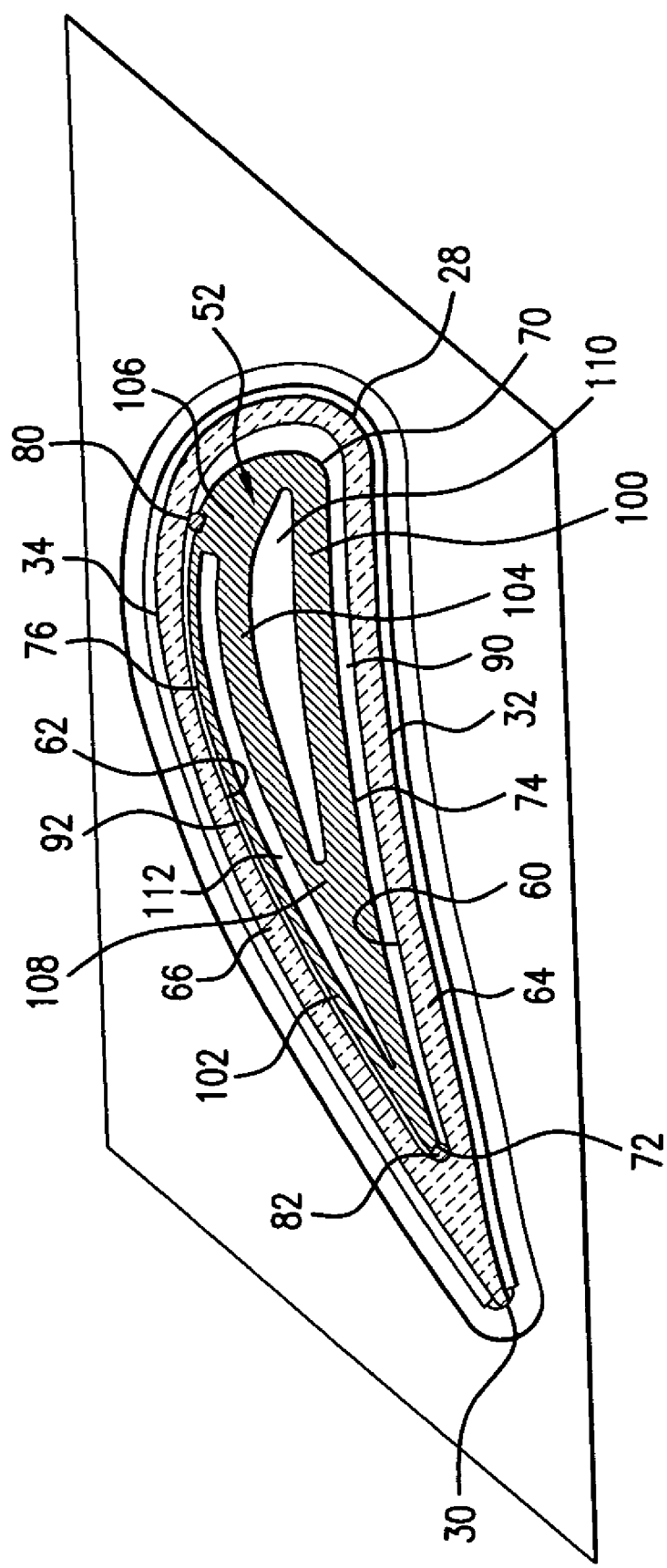
FIG. 3 is a streamwise sectional view of an airfoil of the vane of FIG. 1.

The exemplary vane 20 is an assembly wherein the shroud, platform, and airfoil are separately formed and then secured to each other. FIGS. 1-3 show the airfoil as comprising a thin-walled shell 50 and a structural spar 52 within the shell. Exemplary shell material is a CMC. The shell may be manufactured by various CMC fabrication methods. These typically involve forming a preform of ceramic fiber (e.g., SiC) in the shape of the airfoil (e.g., by weaving or other technique) and infiltrating the preform with matrix material (e.g., also SiC). Prior to infiltration, the preform may be coated for limiting bonding with the matrix (e.g., with BN by chemical vapor deposition (CVD)). Exemplary infiltration techniques include chemical vapor infiltration, slurry infiltration-sintering, polymer-impregnation-pyrolysis, slurry casting, and melt infiltration. Exemplary spar material is a metal alloy (e.g., a cast nickel-based superalloy). Inboard and outboard seals 53 and 54 respectively seal between inboard and outboard ends 55 and 56 of the shell and the adjacent platform and shroud.

An outboard end portion 40 (FIG. 2) of the spar 52 may be mounted to the shroud 26. In the FIG. 2 example, the portion 40 is received in an aperture formed by a surface 42 and welded thereto. A threaded stud 44 is formed at the inboard end of the spar 52 and extends through an aperture in the platform 24 formed by a surface 45. A nut 46 and washers 47 may engage the stud and an inboard surface of the platform while a shoulder 48 of the spar bears up against a mating shoulder 49 of the platform. The spar may thus form the principal mechanical coupling between shroud and platform.

The shell may be positioned relative to the spar by one or more of several mechanisms. The shell flanges 55 and 56 may be located by appropriate channels 57 (FIG. 1) and 58 (FIG. 2) in the platform and shroud, respectively. Additionally, spacers or seal/spacer units such as seals 53 and 54 may be positioned between the spar and the shell.

The shell exterior surface (FIG. 3) defines the leading and trailing edges 28 and 30 and pressure and suction sides 32 and 34. The shell interior surface includes a first portion 60 along the pressure side and a second portion 62 along the suction side. These define adjacent pressure and suction sidewall portions 64 and 66, respectively, which directly merge at the leading edge and merge more gradually toward the trailing edge.

The spar 52 has an exterior surface in close facing spaced-apart relation to the shell interior surface. Thus, the spar exterior surface has a leading edge 70, a trailing edge 72, and pressure and suction side portions 74 and 76. One or more seals 80 and 82 extend generally spanwise between the spar exterior surface and shell interior surface. The exemplary two seals separate the gap between the shell and spar into first and second cavities 90 and 92. The cavities 90 and 92 are fed with air from chambers/cavities/plena (discussed below) within the spar 52.

The exemplary spar 52 has a sidewall with pressure and suction side portions 100 and 102. The exemplary spar 52 includes an internal wall 104 extending from a first junction 106 with the spar sidewall proximate the leading edge to a second junction 108 with the spar sidewall along a trailing portion of the pressure side 102. The wall 104 thus divides the spar interior into a first chamber 110 and a second chamber 112.

The exemplary first chamber 110 extends essentially along a slight majority of the pressure side of the spar. The exemplary second chamber 112 is essentially entirely along the suction side of the spar. These chambers 110 and 112 may feed cooling air to the adjacent cavities 90 and 92 through arrays of fine apertures (not shown) in the spar sidewall. The air introduced to the cavities 90 and 92 may flow generally downstream (toward the trailing edge) and may exit through trailing edge outlets (not shown) in the shell. To flow in this way, the air may thus leak through one or both of the seals (e.g., air from a cavity 90 leaking through the seal 80).

The chambers 110 and 112 may be fed with cooling air via associated ports in one or both of the platform and shroud. FIG. 2 shows a first port 114 in the platform for feeding the second chamber 112 and a port 116 in the shroud and spar outboard end for feeding the first chamber 110. As is discussed below, the ability to introduce air of different pressure and/or temperature to the two chambers 110 and 112 adds flexibility in the selection of appropriate air flow rates, temperatures, and pressures in the cavities 90 and 92 so as to appropriately counteract both thermal and mechanical stresses.

Figure 4:
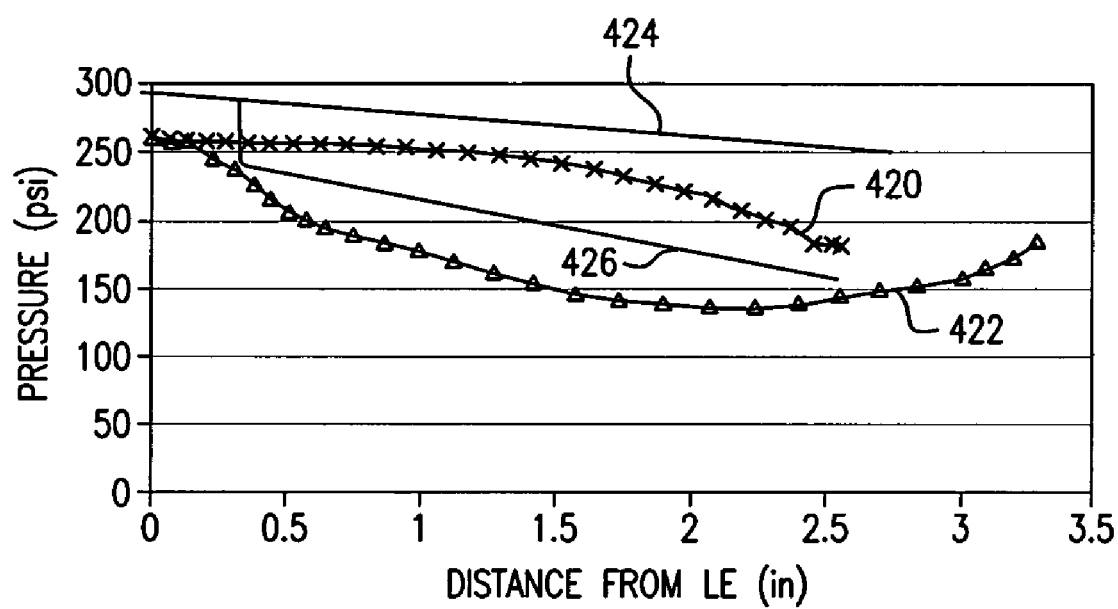
FIG. 4 is a pressure distribution plot for the airfoil of FIG. 3.

FIG. 4 shows streamwise pressure distribution at an exemplary spanwise position along the shell. An external pressure along the airfoil pressure side 32 is shown as 420 and an external suction side 34 pressure is shown as 422. At the leading edge 28, these merge to the stagnation pressure. The internal pressure may be a function of the cooling supply pressure in view of the throttling through the spar holes. In the absence of the seals 80 and 82 and the multi-chamber spar, internal pressure would be substantially constant along both pressure and suction sides of the shell (e.g., with a small upstream-to-downstream decrease due to flow losses). For example, the internal pressure might be slightly above the stagnation pressure (e.g., 2-3% to avoid hot gas ingestion in the event of shell cracking). However, the internal-to-external pressure difference would produce a mechanical stress which, combined with thermal stresses, may exceed design thresholds for the shell.

The presence of the seals 80 and 82 forming the multiple spar-to-shell gap cavities 90 and 92 permits the maintenance of different internal pressures at different locations along the shell. By feeding these through differentially fed (e.g., at different temperatures and/or pressures) spar chambers 110 and 112, an additional degree of flexibility is provided by at least partially further decoupling the pressure in each cavity 90 and 92 from the amount of cooling of the shell along that cavity. For example, in the exemplary FIG. 3 configuration, the internal pressure side pressure 424 remains substantially constant because the entirety of this portion of the shell falls along the first cavity. The suction side pressure 426, however, dips in the region associated with the second cavity. This allows this pressure 426 to more closely accommodate the pressure 422 to reduce the mechanical stress component. In FIG. 4, the distances from the leading edge for the internal pressures are the distances along the spar exterior surface.

To achieve such a pressure distribution, in one example the pressure fed to the second chamber 112 may be less than the pressure fed to the first chamber 110. For example, an exemplary pressure difference is at least 5 psi (e.g., 5-50 psi and, more narrowly 5-10 psi). Percentage-wise, this pressure difference may be at least 1.5% (e.g., 1.5-15%). In another optionally concurrent example, the second chamber 112 may be fed with bleed air from one or more of the relatively early/upstream compressor stages while the first chamber 110 is fed with bleed air from later/downstream compressor stages where both pressure and temperature are higher.

Figure 5:
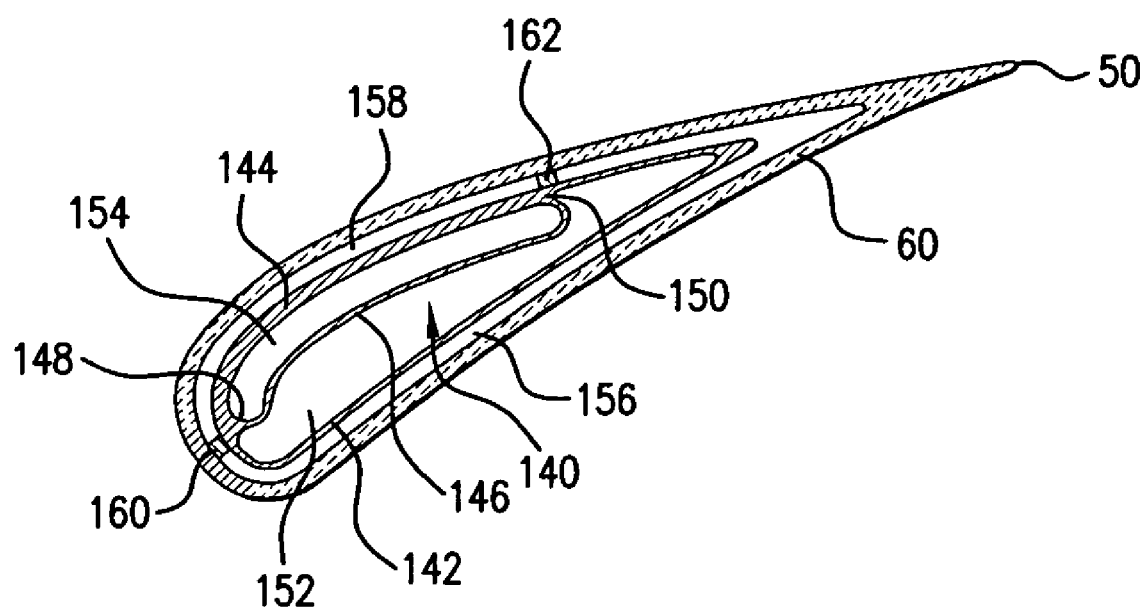
FIG. 5 is a streamwise sectional view of an alternate airfoil.

FIG. 5 shows an alternate spar 140 having a sidewall with pressure and suction side portions 142 and 144. An exemplary spar 140 includes an internal wall 146 extending from a first junction 148 with the spar sidewall proximate the leading edge to a second junction 150 with the spar sidewall along the suction side 144. The wall 146 divides the spar interior into a first chamber 152 and a second chamber 154. The exemplary first chamber 152 extends essentially along the entirety of the pressure side and along small leading and trailing portions of the suction side. The exemplary second chamber 154 is essentially entire along the suction side. These chambers 152 and 154 may feed cooling air to the adjacent cavities 156 and 158. The exemplary cavities are separated by seals 160 and 162 and may be fed similarly to the respective cavities of the FIG. 3 embodiment. The first seal 160 is positioned slightly to the suction side of the leading edge. The second seal 162 is positioned at an intermediate location along the suction side (e.g., between about 50% and 70% of the streamwise length along the suction side).

Figure 6:
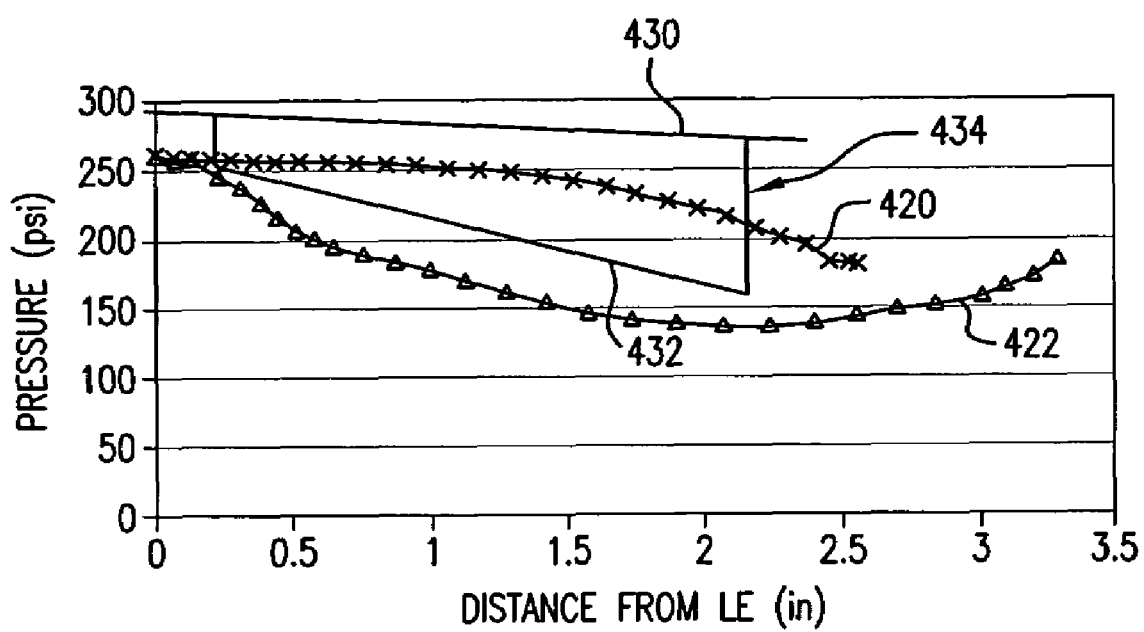
FIG. 6 is a pressure distribution of the airfoil of FIG. 5.

FIG. 6 shows pressure and suction side internal pressures 430 and 432 for the airfoil of FIG. 5. Due to the presence in the second seal 162, there is an abrupt jump 434 in the suction side pressure 432 to essentially merge with the pressure side distribution downstream of the second seal 162.

Figure 7:
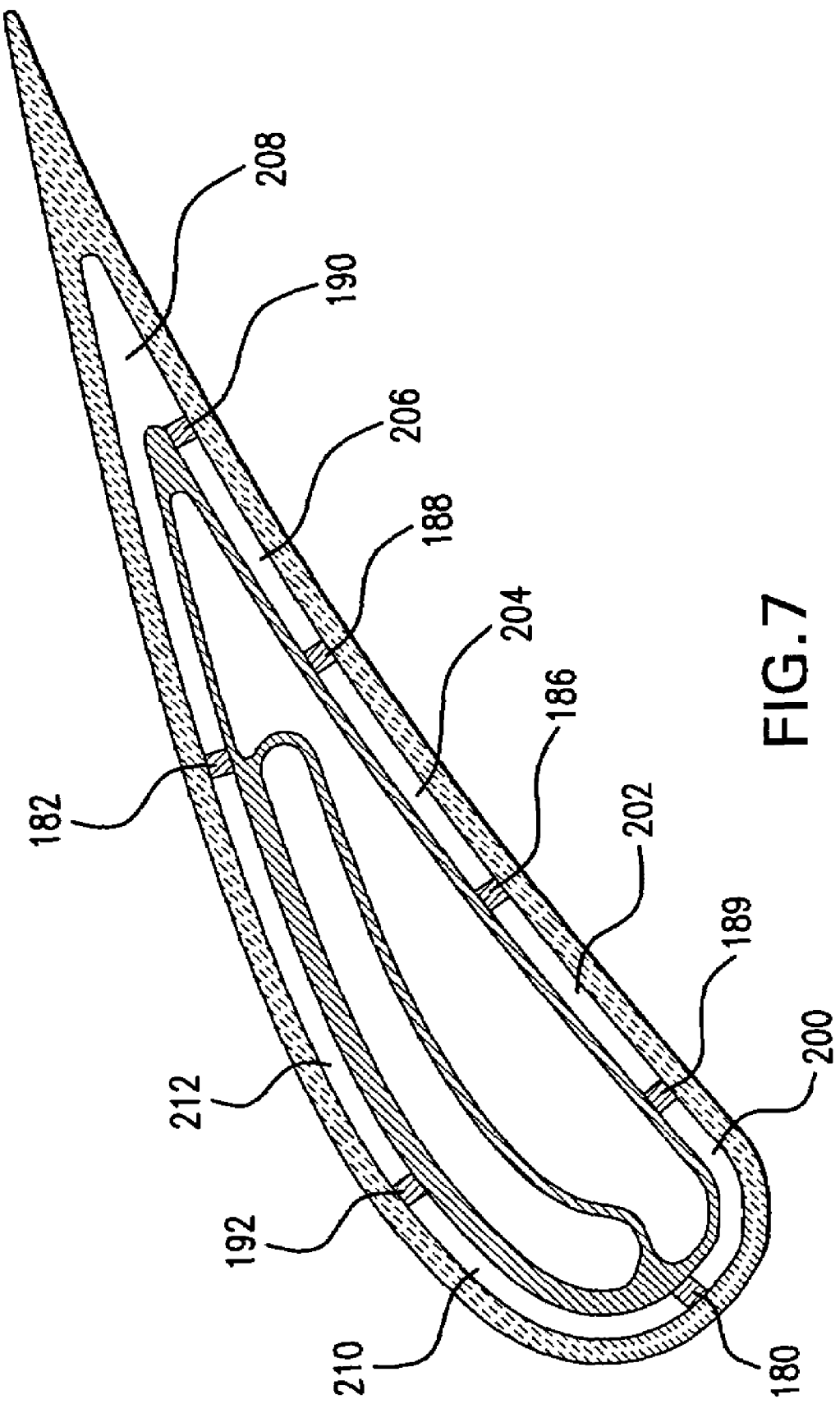
FIG. 7 is a streamwise sectional view of a second airfoil.

In a further variation, FIG. 7 shows an airfoil having a similar shell and spar to those of FIG. 5 but having a greater number of seals forming a greater number of cavities. In the particular FIG. 7 example, seals 180 and 182 are similarly positioned to the seals 160 and 162 of FIG. 5. However, the associated cavities are further subdivided by an exemplary group of seals 184, 186, 188, and 190 along the pressure side and an exemplary single seal 192 along the suction side. Thus, a series of cavities 200, 202, 204, 206, and 208 replace the cavity 156 and a pair of cavities 210 and 212 replace the cavity 158. Other variations might involve repositioning of the seals 180 and 182 or reconfiguring the spar chambers. The positioning of the seals, the robustness of their sealing engagement (including provision of controlled leaks) and the distribution of the feed holes from the spar chambers allow further tailoring of the pressure distributions within and along each of the cavities.

Figure 8:
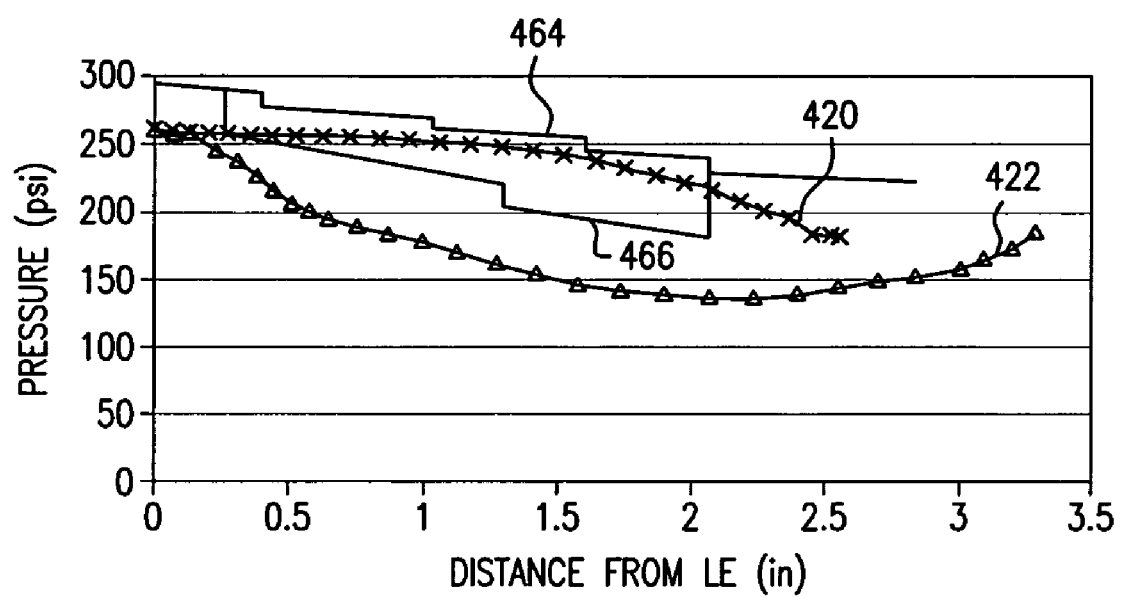
FIG. 8 is a pressure distribution of the airfoil of FIG. 7.

FIG. 8 again shows the basic external pressures 420 and 422. The internal pressures 464 on the pressure side and 466 on the suction side of the FIG. 7 airfoil show a greater number of steps than the pressures of FIG. 6. The steps correspond to the cavity-to-cavity transitions and permit the pressure distributions to more closely correspond to the associated external pressures to further reduce the pressure difference across the shell wall.

The invention may be implemented in the reengineering of a given vane. The reengineering may preserve the basic external profile of the shell. The reengineering may also preserve the internal profile. However, internal changes including wall thinning may be particularly appropriate in view of the available stress reduction. In this vein, the reengineering may also eliminate other internal strengthening features such as tensile ribs/webs, locally thickened areas, and the like. The reengineering may also more substantially alter the spar structure. In addition to the provision of appropriate spar chambers, the reengineering may replace a multi-piece spar with a single piece spar. The reengineering may replace the combination of a single spar and non-structural filler component with a single spar. The reengineered vane may be used in the remanufacturing of a given gas turbine engine.

Figure 9:
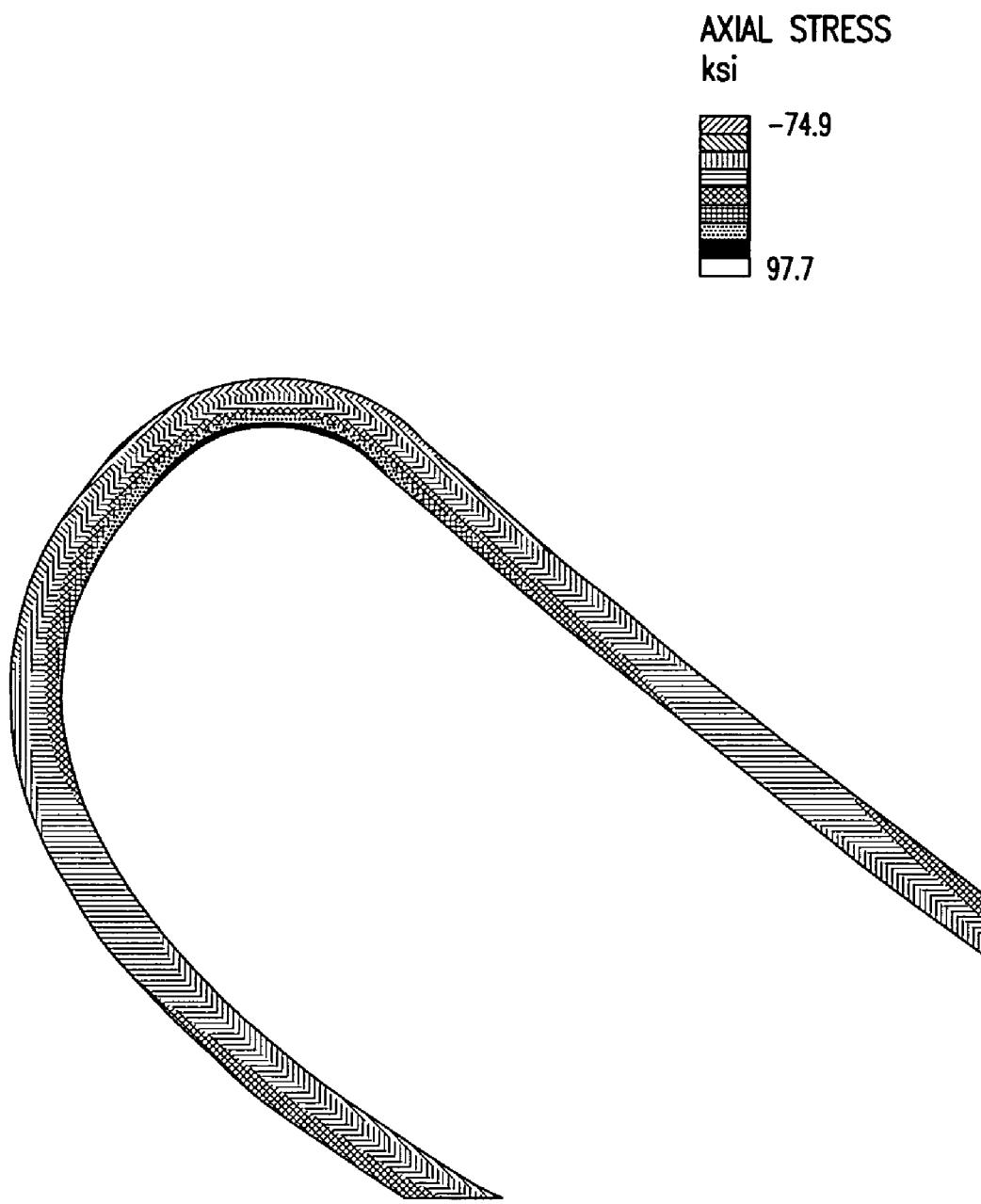
FIG. 9 is a plot of axial stress for a baseline airfoil.
Figure 10:
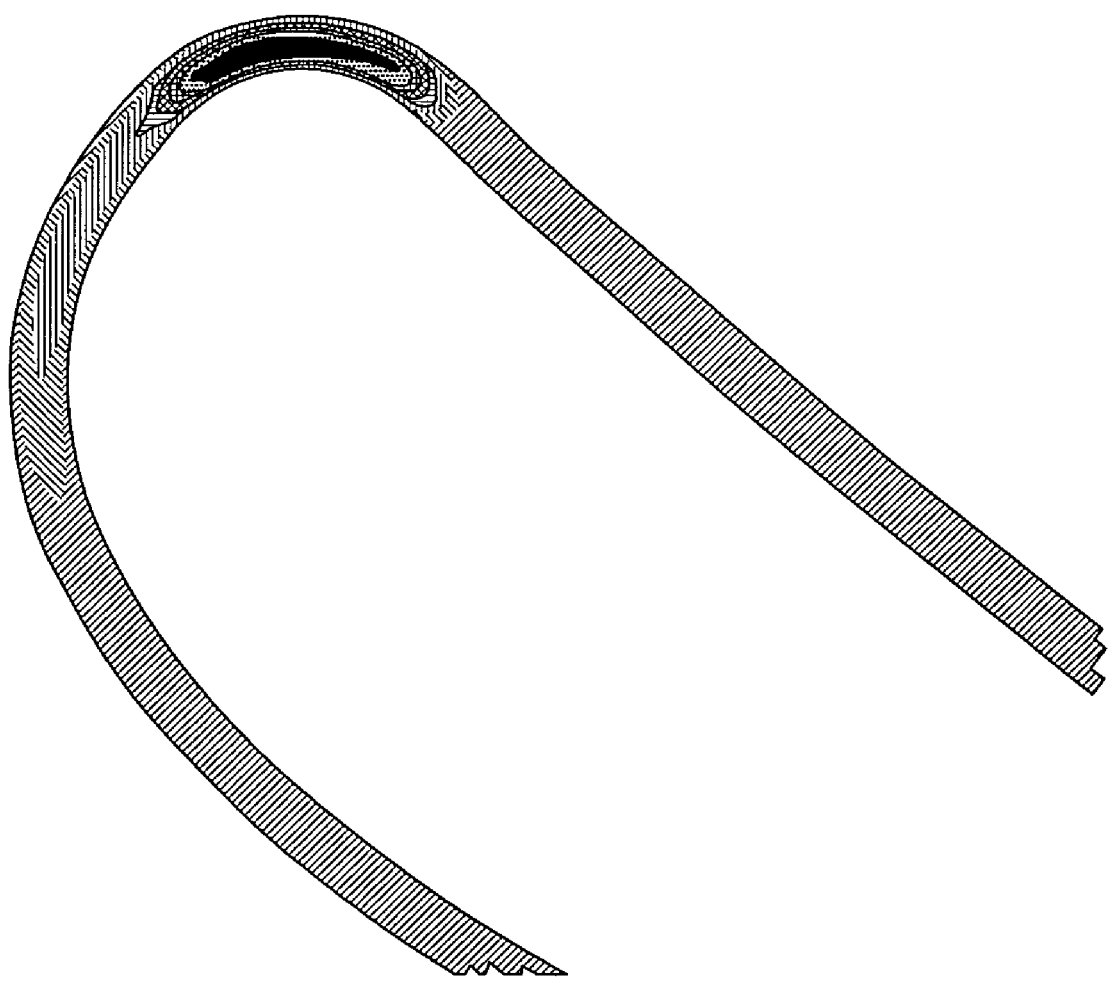
FIG. 10 is a plot of interlaminar tensile stress for the baseline airfoil.

In a prophetic example of a reengineering, FIG. 9 plots axial stress along a leading portion of the shell of a baseline airfoil with substantially constant internal pressure slightly above the stagnation pressure. FIG. 10 shows the interlaminar tensile stress.

Figure 11:
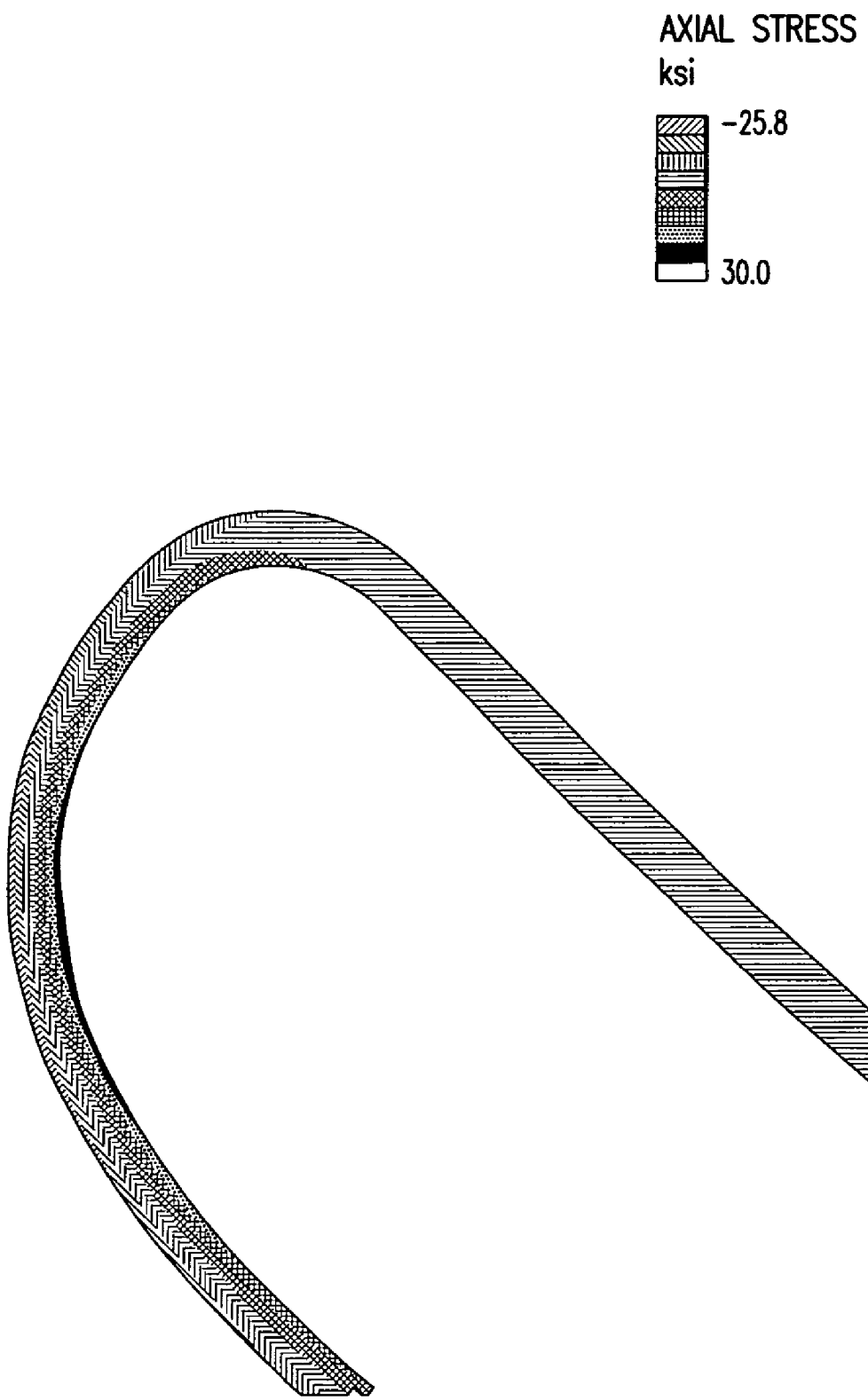
FIG. 11 is a plot of axial stress for a reengineered airfoil.
Figure 12:
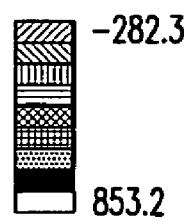
FIG. 12 is a plot of interlaminar tensile stress for the reengineered airfoil.
Figure 12:
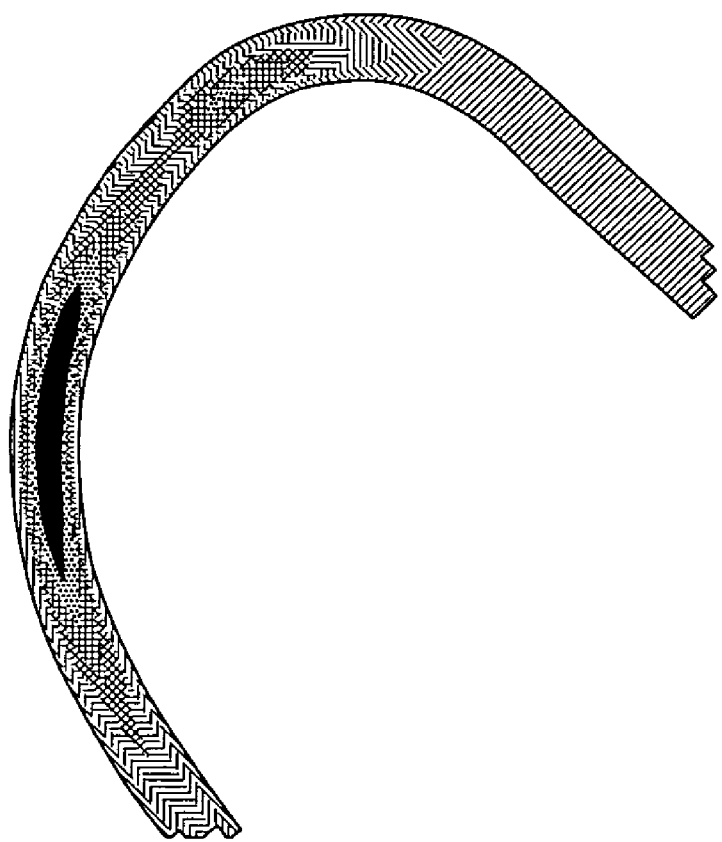

With a 30% internal pressure reduction relative to the pressure distribution of the baseline vane, FIGS. 11 and 12 show the corresponding axial and interlaminar tensile stresses, respectively. Peak magnitudes of the stresses appear substantially reduced.

One or more embodiments of the present invention have been described. Nevertheless, it will be understood that various modifications may be made without departing from the spirit and scope of the invention. For example, when implemented as a reengineering of an existing vane configuration (e.g., as part of a remanufacturing of an engine or reengineering of the engine configuration) details of the baseline engine configuration or vane configuration may influence details of any particular implementation. Accordingly, other embodiments are within the scope of the following claims.

What is claimed is:

1. A vane comprising:
an airfoil shell comprising a ceramic matrix composite and having:
a leading edge;
a trailing edge;
a pressure side; and
a suction side;
a metallic spar within the shell;
an outboard shroud at an outboard end of the shell; and
an inboard platform at an inboard end of the shell,
wherein the spar comprises:
a first chamber essentially along the suction side; and
a second chamber along the pressure side opposite the first chamber.

2. The vane of claim 1 wherein:
the airfoil shell consists essentially of said ceramic matrix composite;
the spar consists essentially of a first metallic casting;
the platform consists essentially of a second metallic casting; and
the shroud consists essentially of a third metallic casting.

3. The vane of claim 1 wherein:
the spar comprises a sidewall having:
a leading edge;
a trailing edge;
a pressure side; and
a suction side; and
the shell lacks tensile webs connecting the shell pressure and suction sides.

4. The vane of claim 1 wherein:
the spar comprises a sidewall having:
a leading edge;
a trailing edge;
a pressure side; and
a suction side; and
the spar first chamber is formed by a wall extending from proximate the spar leading edge to the spar sidewall at the suction side.

5. The vane of claim 1 further comprising:
a plurality of seals between the shell and spar.

6. The vane of claim 5 wherein:
the plurality of seals comprise at least one of ceramic rope seals and metallic bellows seals.

7. The vane of claim 5 wherein:
the plurality of seals include first and second seals defining a cavity starting along the suction side downstream of the leading edge and ending at the trailing edge or along the suction side upstream of the trailing edge.

8. A method of manufacturing the vane of claim 1 comprising:
casting the shroud;
casting the platform;
casting the spar; and
ceramic matrix infiltration of a ceramic fiber preform to form the shell.

9. The method of claim 8 wherein:
a plurality of spanwise seals are positioned between the spar and shell.

10. A method of cooling the vane of claim 1 comprising:
directing a first airflow to the first chamber; and
directing a second airflow to the second chamber, the second airflow having at least one of different temperature and pressure than the first airflow.

11. The method of claim 10 wherein:
the first and second airflows are introduced through different spanwise ends of the spar.

12. The method of claim 10 wherein:
the first airflow has a lower pressure than the second airflow.

13. A vane comprising:
an airfoil shell having:
a leading edge;
a trailing edge;
a pressure side; and
a suction side;
a spar within the shell;
an outboard shroud at an outboard end of the shell; and
an inboard platform at an inboard end of the shell,
wherein the spar comprises:
multi-chamber means in the spar for limiting thermal mechanical stress on the shell.

14. The vane of claim 13 further comprising:
a first air inlet port in the platform; and
a second air inlet port in the shroud.

15. The vane of claim 13 wherein:
the shell is a CMC; and
the spar is metallic.

16. A method for engineering a vane having:
an airfoil shell having:
   a leading edge;
   a trailing edge;
   a pressure side; and
   a suction side;
a spar within the shell;
an outboard shroud at an outboard end of the shell; and
an inboard platform at an inboard end of the shell,
the method comprising:
   configuring a plurality of chambers within the spar to provide airflow to cavities between the spar and shell so as to provide a desired internal pressure distribution within the shell.

17. The method of claim 16 being a reengineering, wherein an external sectional shape of the shell is preserved from a baseline.

18. The method of claim 16 being a reengineering from a baseline configuration to a reengineered configuration wherein:
   operational extreme magnitudes of positive axial stress, negative axial stress, positive interlaminar tensile stress, and negative interlaminar tensile stress are all reduced by at least 50% from the baseline configuration to the reengineered configuration.

19. The method of claim 16 being a reengineering from a baseline configuration to a reengineered configuration wherein:
   the shell is thinned at least at one location along a leading tenth of the shell from the baseline configuration to the reengineered configuration.

20. The method of claim 16 wherein:
the shell is a ceramic matrix composite; and
the spar is a single metallic spar.

* * * * *